United States Patent [19]

Bartholomäus

[11] Patent Number: 4,488,574
[45] Date of Patent: Dec. 18, 1984

[54] PRESSURE CONTROL VALVE ARRANGEMENT

[75] Inventor: Reiner Bartholomäus, Neuendorf, Fed. Rep. of Germany

[73] Assignee: Mannesman Rexroth GmbH, Lohr, Fed. Rep. of Germany

[21] Appl. No.: 405,101

[22] Filed: Aug. 4, 1982

[30] Foreign Application Priority Data

Sep. 12, 1981 [DE] Fed. Rep. of Germany ....... 3136174

[51] Int. Cl.³ ............................................. G05D 16/20
[52] U.S. Cl. ............................ 137/487.5; 137/625.65; 137/625.68; 251/325; 338/42
[58] Field of Search ........... 137/487.5, 625.65, 625.68; 251/325; 200/81.9 M, 82 E, 83 L, 83 Q; 338/42

[56] References Cited

U.S. PATENT DOCUMENTS 3,921,666 11/1975 Leiber .................... 137/596.16 X
4,051,451 9/1977 Kurtz et al. ................. 338/42
4,133,511 1/1979 Hartmann et al. ......... 137/487.5 X
4,318,333 3/1982 Cemeska ................. 137/625.68 X
4,413,648 11/1983 Walters et al. ............ 137/487.5 X

FOREIGN PATENT DOCUMENTS 218175 10/1958 Australia ...................... 137/487.5

Primary Examiner—Gerald A. Michalsky
Assistant Examiner—John C. Fox
Attorney, Agent, or Firm—Michael J. Striker

[57] ABSTRACT

A pressure control valve arrangement includes a control slide valve body which is slidably accommodated in a central bore of a valve housing. The control slide valve body is acted upon at one of its axial sides by the controlled pressure, and at its other axial side by a tappet of a proportional electromagnet. The proportional magnet has a magnet housing which is rigidly connected to the valve housing. To provide a pressure control valve arrangement in which the accuracy of the pressure control is not influenced by disturbing factors, a pressure indicator is accommodated in the magnet housing; at least the pressure-responsive member of the pressure indicator is acted upon by the controlled pressure, which is supplied thereto through a connecting bore in the magnet housing and a part of the central bore of the valve housing in which the controlled pressure prevails. A connecting line of the pressure indicator is lead to the exterior of the magnet and valve housings for derivation of the measured value therefrom. The measured value may then be compared with a reference value, and the result of the comparison may be used for controlling the coil of the proportional magnet, possibly after amplification.

5 Claims, 1 Drawing Figure

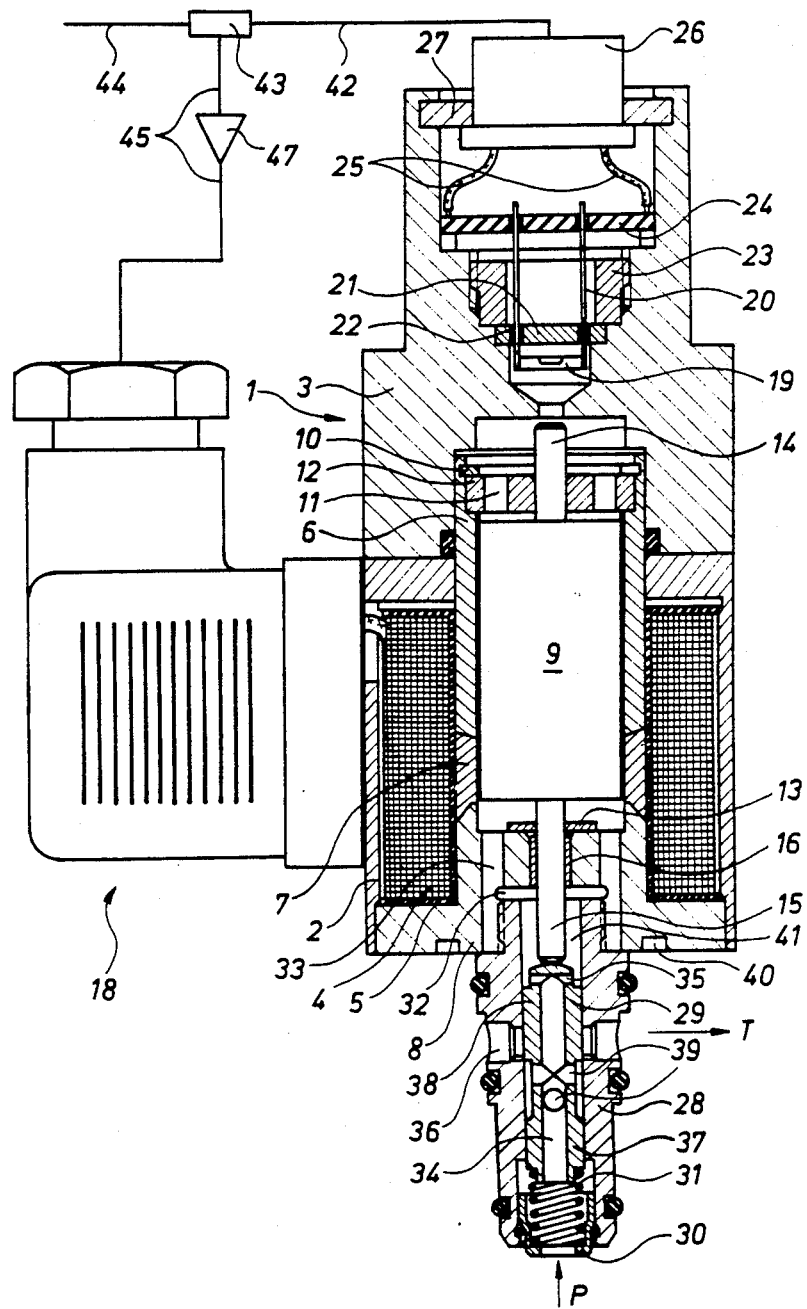

20
PRESSURE CONTROL VALVE ARRANGEMENT

BACKGROUND OF THE INVENTION

The present invention relates to pressure control valve arrangements in general, and more particularly to pressure control valve arrangements in which an electromagnet is used for controlling the operation of the valve arrangement proper.

There are already known various constructions of pressure control valve arrangements in which a slide valve is received in a central bore of a valve housing for axial sliding therein, wherein the controlled pressure acts on the slide valve at its control side and in which the slide valve is acted upon at its opposite side by a tappet of a proportional magnet accommodated in a magnet housing which is rigidly connected with the valve housing.

It is also known to move the control slide valve of a pressure regulating or controlling valve by means of a tappet of a reciprocatory magnet which is constructed as a proportional magnet against the force of a spring, wherein the magnet force acts directly or indirectly via a spring on the control slide valve which is to control the fluid flowing through the arrangement. The pressure being controlled acts in the conventional constructions oppositely to the magnet force. The control accuracy of this conventional control valve arrangement is independent on the pressure of the fluid being controlled; however, it is dependent on the magnetic hysteresis, temperature, friction, and the like. This, of course, is very disadvantageous.

SUMMARY OF THE INVENTION

Accordingly, it is a general object of the present invention to avoid the disadvantages of the prior art.

More particularly, it is an object of the present invention to provide a pressure control valve arrangement which does not possess the disadvantages of the conventional arrangements of this type.

Still another object of the present invention is to so construct the arrangement of the type here under consideration as to eliminate or at least greatly diminish the influence of the disturbing factors on the accuracy of the pressure control in the arrangement.

It is a concomitant object of the present invention so to design the arrangement of the above type as to be simple in construction, inexpensive to manufacture, easy to operate, and reliable in operation nevertheless.

In pursuance of these objects and others which will become apparent hereafter, one feature of the present invention resides in a pressure control valve arrangement which comprises a valve housing bounding a bore; a slide valve axially displaceable in the bore and having two axial end faces one of which delimits a controlled pressure compartment in the bore; a magnet housing rigid with the valve housing; a proportional magnet accommodated in the magnet housing and including a tappet magnetically displaceable in the axial direction of the bore and acting on the other of the axial end faces of the slide valve; a pressure indicator received in the magnet housing, including a pressure-responsive member, and operative for generating a pressure-indicative signal; means for admitting the pressure prevailing in the controlled pressure compartment of the bore at least to the pressure-responsive member of the pressure indicator to act thereon and to cause the pressure indicator to generate a pressure-indicative signal; and at least one connecting line leading from the pressure indicator to the exterior of the housings for delivering the pressure-indicative signal thereto.

A particular advantage of this construction is that, due to its accommodation in the magnet housing, the pressure indicator is situated remotely from the valve housing, so that the construction of the latter is not influenced by the pressure indicator. On the other hand, the construction of the magnet housing is not significantly influenced by the accommodation of the pressure indicator therein.

A particularly advantageous construction of the pressure indicator is obtained when, in accordance with a currently preferred aspect of the present invention, the magnet further includes a core having one axial side facing toward, and another axial side facing away from the tappet, and when the pressure indicator is constituted by a pressure measuring cell arranged at the other axial side of the core.

A simple and otherwise advantageous construction is obtained when the pressure indicator further includes a conductor plate and at least one holding pin connecting the conductor plate with the pressure-responsive member, and when the arrangement further comprises a mounting plate having at least one passage for the holding pin, and at least one insulating layer interposed between the mounting plate and the holding pin. The arrangement may then further include a hollow threaded element or screw mounted in the magnet housing and holding the mounting plate in position, the holding pin then passing through the hollow threaded element with a clearance therefrom.

In accordance with a further advantageous facet of the present invention, the pressure control valve arrangement further comprises means for controlling the operation of the proportional magnet, such controlling means including means for generating a desired-pressure signal, means for subtracting one of the pressure-indicative and desired-pressure signals from the other and for issuing a control signal indicative of the result, and means for supplying the control signal to the proportional magnet.

The novel features which are considered as characteristic of the invention are set forth in particular in the appended claims. The improved pressure control valve arrangement itself, however, both as to its construction and its mode of operation, together with additional features and advantages thereof, will best be understood upon perusal of the following detailed description of certain specific embodiments with reference to the accompanying drawing.

BRIEF DESCRIPTION OF THE DRAWING

The sole FIGURE of the drawing is an axial sectional view of a pressure control valve arrangement of the present invention showing certain components thereof in a diagrammatic fashion.

DETAILED DESCRIPTION OF THE PREFERRED EMBODIMENTS

Referring now to the drawing in detail, it may be seen that the reference numeral 1 has been used to identify a proportional magnet. The proportional magnet or electromagnet 1 has two coaxially arranged hollow housing parts 2 and 3 which are rigidly connected with one another. The housing part 2 serves to accommodate a magnet coil 4 which is arranged on a cross-sectionally U-shaped winding body 5. In the hollow winding body 5, there are arranged a sleeve 6 which extends into the housing part 3, an intermediate sleeve 7 and an end piece 8. The components 5 and 7 are made of a non-magnetic material. The two sleeves 6 and 7 and the end piece 8 are coaxially arranged.

A magnet core 9 is arranged with radial clearance in the two sleeves 6 and 7. The extent of movement of the magnet core 9 is limited, at one axial side, by a guiding disk 12 which is provided with through passages 11 and is held in the sleeve 6 by a spring ring 10. The extent of movement of the magnet core 9 is limited, at the other axial side, by an abutment disk 13 which is mounted on the end piece 8. A guiding pin 14 is provided at the upper end of the magnet core 9, as considered in the drawing. The guiding pin 14 is guided in the guiding disk 12. A tappet 15 is secured at the other axial side of the magnet core 9. The tappet 15 is guided by means of a bearing 16 which is inserted into the end piece 8. An outwardly extending plug 18 is provided on the housing part 2 at the region of the magnet coil 4.

A pressure measuring cell 19 which is to serve as a pressure indicator is arranged coaxially with the magnet core 9 at the axial side of the latter which faces away from the tappet 15. The pressure measuring cell or pressure indicator 19 includes two holding pins 20 which pass through a mounting or carrier plate 21 and are insulated with respect to the latter by means of an insulating layer or bushing 22 each. The pressure measuring cell 19 is being held in the housing part 3 by means of a hollow screw or a similar threaded element 23, through which the holding pins 20 pass with a clearance. The holding pins 20 are secured to a conductor plate 24 which is inserted into the housing part 3 and is provided with electronic control circuitry. The conductor plate or circuit board 24 connects the holding pins 20 with two conductor lines 25. The conductor lines 25 lead to a plug body 26 which extends to the exterior of the housing part 3 and is attached to a mounting plate 27 which is held in the housing part 3 by being engaged by upset portions of the latter. The plug body 26, as well as the pressure measuring cell 19, the carrier plate 21, the hollow screw 23 and the conductor plate 24, are arranged coaxially to the magnet core 9.

A valve housing 28 is threaded into the housing part 3 at the side of the latter which is remote from the plug body 26. The valve housing 28 has a central bore 41 which slidably accommodates a control slide valve body 29. A helical compression spring 31 is confined between the control slide valve body 29 and a holding sleeve 30 which is secured to the valve housing 28 by means of a resilient locking ring. The compression spring 31 urges the control slide valve body 29 toward and into abutment with the tappet 15.

The central bore 41 in the valve housing 28 which accommodates the control slide valve body 29 is connected with the space accommodating the magnet core 9, through a space 32 provided between the valve housing 28 and the end piece 8, as well as through an axially extending passage 33 in the end piece 8. The control slide valve body 29 has a longitudinally extending bore 34 and a transverse bore 35 situated at the region of the tappet 15, so that the space delimited by the holding sleeve 30 in the valve housing 28 is in communication with the space accommodating the magnet core 9 which, in turn, is in communication with the space accommodating the pressure indicator cell 19 through the bores 11 and the longitudinal bore in the housing part 3.

A control port 36 is provided in the valve housing 28. The control port 36 is connected with a supply reservoir T that has been omitted from the drawing. The control slide valve body 29 includes two slide pistons 37 and 38 which are rigidly connected with one another by a connecting part. The control slide valve body 29 further has transverse bores 39 which are arranged in a crosswise manner and which open into a groove delimited by the aforementioned connecting part. The slide piston 37 guides the control slide valve body 29 in the valve housing 28, while the slide piston 38 serves, besides guiding the slide valve body 29, or controlling the control port 36 in the valve housing 28 which communicates with the supply reservoir T. A pressurized fluid source P, such as a pump, which has also been omitted from the drawing in order not to unduly encumber the same, is connected to the holding sleeve 30. The plug body 26 is connected by a connecting line 42 with a comparator or subtractor member 43 of a conventional construction, which is connected by a connecting line 44 with a non-illustrated source of a reference or desired value or signal. The comparator or subtractor 43 is further connected through a connecting line 45 with the magnet coil 4 of the proportional magnet or electromagnet 1. An amplifier 47 is interposed into the connecting line 45.

The valve housing 28 is constructed as a housing component which can be mounted in another component. For this reason, the valve housing 28 is equipped with sealing elements at its exterior, in order to seal the gap between the other component and the valve housing 28. A non-illustrated sealing ring is arranged in a groove 40 provided at the end portion of the housing part 2 of the proportional magnet 1 which is closer to the valve housing 28.

During the operation of the above-discussed pressure control valve arrangement, the electrical signal which is produced by the pressure measuring cell 19 is compared in the subtractor 43 with the predetermined desired or reference value. The difference signal obtained in this manner is supplied, after it has been amplified by the amplifier 47, to the magnet coil 4 to serve as a control signal thereat. Consequently, the control slide valve body 29 is moved either by the magnet core 9 or by the compression spring 31 in dependence on the pressure prevailing in the pressurized fluid, especially pressurized liquid, as measured by the pressure measuring cell 19. Thus, the pressure controlling valve arrangement described above acts as a pressure limiting valve arrangement.

However, another pressure, for instance, a working pressure, may be detected by the pressure measuring cell 19, in the event that the holding sleeve 30 is connected with a space in which such working pressure prevails, and the valve housing 28 is provided with a transverse port which opens onto the control slide piston 37 and is fully closed thereby in the illustrated position of the control slide 29 and is controlled by the control slide piston 37 to gradually open as the control slide body 29 moves in the downward direction from its illustrated position. A pressure controlling valve arrangement of this construction operates as a pressure reduction valve arrangement.

The initially described control valve arrangement can also be used as a pre-control valve arrangement, when the valve housing 28 and the control slide valve body 29 are correspondingly modified. In this case, the crosswise arranged transverse bores 39 are not provided in the control slide valve body 29. Then, the pressure of the hydraulic device to be pre-controlled, for instance of a pressure reduction valve, a pump, or the like, is measured by the pressure measuring cell 19.

It is also possible and contemplated by the present invention to provide the valve housing 28 with a transverse bore controlled by the slide piston 37 and connected to a pressurized fluid source, as well as, additionally, with a transverse bore opening into the space between the two slide pistons 37 and 38 and leading to a main valve. The pressure to be measured, be it the pressure of the main valve or of the pump, is then supplied to the holding sleeve 30.

It will be understood that each of the elements described above, or two or more together, may also find a useful application in other types of arrangements differing from the type described above.

While the invention has been illustrated and described as embodied primarily in a pressure-limiting valve arrangement, it is not limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. A pressure control valve arrangement, comprising a valve housing bounding a bore centered on an axis; a slide valve axially displaceable in said bore and having two axial end faces one of which delimits a controlled pressure compartment in said bore; a magnet housing rigid with said valve housing; a proportional magnet accommodated in said magnet housing and including a tappet magnetically displaceable in the axial directions of said bore and acting on the other of said axial end faces of said slide valve; a pressure indicator received in said magnet housing at the opposite axial side of said proportional magnet from said slide valve, including a pressure-responsive member, and operative for generating a pressure-indicative signal; means for admitting the pressure prevailing in said controlled pressure compartment of said bore through said proportional magnet at least to said pressure-responsive member of said pressure indicator to act thereon and to cause said pressure indicator to generate a pressure-indicative signal; and at least one connecting line commencing at said pressure indicator and having a terminal portion situated externally of said housings for furnishing said pressure-indicative signal.

2. The arrangement as defined in claim 1, wherein said magnet further includes a core having one axial side facing toward, and another axial side facing away from, said tappet; and wherein said pressure indicator is constituted by a pressure measuring cell arranged at said other axial side of said core.

3. The arrangement as defined in claim 1, wherein said pressure indicator further includes a conductor plate, and at least one holding pin connecting said conductor plate with said pressure-responsive member; and further comprising a mounting plate having at least one passage for said holding pin, and at least one insulating layer interposed between said mounting plate and said holding pin.

4. The arrangement as defined in claim 3, further comprising a hollow threaded element mounted in said magnet housing and holding said mounting plate in position therein; and wherein said holding pin passes through said hollow threaded element with a clearance therefrom.

5. The arrangement as defined in claim 1; and further comprising means for controlling the operation of said proportional magnet, including means for generating a desired-pressure signal, means for subtracting one of said pressure-indicative and desired-pressure signals from the other and for issuing a control signal indicative of the result of the subtraction, and means for supplying the control signal to said proportional magnet.

* * * * *